(12) United States Patent
Nakamura et al.

(10) Patent No.: US 8,612,109 B2
(45) Date of Patent: Dec. 17, 2013

(54) VEHICULAR RUNNING CONTROL APPARATUS AND VEHICULAR RUNNING CONTROL METHOD

(75) Inventors: Masahide Nakamura, Yokohama (JP); Koki Minegishi, Atsugi (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1208 days.

(21) Appl. No.: 12/182,686

(22) Filed: Jul. 30, 2008

(65) Prior Publication Data

US 2009/0037064 A1  Feb. 5, 2009

(30) Foreign Application Priority Data

Jul. 31, 2007 (JP) ................................. 2007-199038
Apr. 2, 2008 (JP) ................................. 2008-096503

(51) Int. Cl.
| G06F 7/70 | (2006.01) |
| G06F 19/00 | (2011.01) |
| G06F 7/00 | (2006.01) |
| G06F 17/00 | (2006.01) |
| G06G 7/00 | (2006.01) |
| G06G 7/76 | (2006.01) |
| G06G 1/00 | (2006.01) |
| B60T 8/24 | (2006.01) |

(52) U.S. Cl.
USPC ............................................. 701/70; 701/72

(58) Field of Classification Search
USPC ................................................ 701/70, 72
See application file for complete search history.

(56) References Cited

U.S. PATENT DOCUMENTS

| 7,765,048 B2 | 7/2010 | Suzuki et al. |
| 2002/0161510 A1* | 10/2002 | Matsuura ...................... 701/200 |
| 2004/0111209 A1* | 6/2004 | Kagawa et al. ................. 701/93 |
| 2007/0078584 A1* | 4/2007 | Nakamura et al. ............. 701/93 |
| 2010/0198474 A1 | 8/2010 | Shiba et al. |

FOREIGN PATENT DOCUMENTS

| CN | 1944125 A | 4/2007 |
| EP | 1085296 A2 | 3/2001 |
| JP | 6-36187 A | 2/1994 |
| JP | 2005-119388 A | 5/2005 |
| JP | 2005-164470 A | 6/2005 |
| JP | 2005-306284 A | 11/2005 |
| JP | 2006-256593 A | 9/2006 |
| JP | 2006-347528 A | 12/2006 |

* cited by examiner

Primary Examiner — Thomas Tarcza
Assistant Examiner — Imran Mustafa
(74) Attorney, Agent, or Firm — Foley & Lardner LLP

(57) ABSTRACT

In vehicular running apparatus and method, a yaw rate target deceleration calculated on a basis of a yaw rate and a preset lateral acceleration set value is compared with a navigation target deceleration calculated on a basis of a target vehicle speed calculated on a basis of a state of a curved road located in front of a running road on which the vehicle is running and the preset lateral acceleration to select a target deceleration from one of the yaw rate and navigation target decelerations which is lower than the other and a target vehicle speed command value is calculated on a basis of the selected target deceleration, the calculated vehicle speed command value being outputted to decelerating means of the vehicle.

18 Claims, 13 Drawing Sheets

IF A CURVED ROAD IS DETECTED IN FRONT OF
THE HOST VEHICLE DURING A RUM OF THE HOST VEHICLE
AT A SET VEHICLE SPEED AND A TARGET VEHICLE
SPEED COMMAND VALUE BECOMES SMALLER THAN
THE HOST VEHICLE SPEED, AN ALARM OPERATION
FLAG IS SET TO "1" TO OPERATE ALARM.

IF A CURVED ROAD IS DETECTED IN FRONT OF
THE HOST VEHICLE DURING A RUN OF THE HOST VEHICLE
AT A SET VEHICLE SPEED AND A TARGET VEHICLE
SPEED COMMAND VALUE BECOMES SMALLER THAN
THE HOST VEHICLE SPEED, A DECELERATION CONTROL
OPERATION FLAG IS SET TO "1" TO OPERATE A DECELERATION CONTROL.

A: THE RADIUS OF TURN CALCULATED FROM NAVIGATION INFORMATION HAS EXCEEDED THE CURVED ROAD ENTRANCE-OR-EXIT DETERMINATION THRESHOLD VALUE

B: THE RADIUS OF TURN CALCULATED FROM DRIVER OPERATION HAS EXCEEDED CURVED ROAD ENTRANCE-OR-EXIT DETERMINATION THRESHOLD VALUE

VEHICULAR RUNNING CONTROL APPARATUS AND VEHICULAR RUNNING CONTROL METHOD

BACKGROUND OF THE INVENTION (1) Field of the Invention

The present invention relates to vehicular running control apparatus and vehicular running control method, utilizing a car navigation system and an autonomous running control system. The present invention more particularly relates to the vehicular running control apparatus and vehicular running control method which can achieve an appropriate running (or traveling) control for the vehicle in a case where a curved road state located in front of a running road on which the vehicle is running obtained by a car navigation system is different from an actual situation of the curved road.

(2) Description of Related Art

As a recent trend, car navigation systems mounted in many automotive vehicles and have functions to detect a present running position of the vehicle using a road map information, a GPS (Global Positioning System) function, and so forth and to calculate a running route from the detected present position to a final destination position to guide the vehicle. In addition, many vehicular running control techniques to perform a vehicular vehicle speed control and so forth compositely of a host vehicle (the host vehicle is used in place of the vehicle in which the vehicular running control technique described herein is adopted) utilizing the functions of the car navigation system have been proposed.

A Japanese Patent Application First Publication (tokkai) No. Heisei 6-36187 published on Feb. 10, 1994 exemplifies a previously proposed vehicular running control apparatus in which, when a curved road is detected in front of the running road on which the host vehicle is running, a target vehicle speed of the host vehicle is calculated when the host vehicle is passed through the curved road from a dimension and so forth of the curved road and a target deceleration to obtain the target vehicle speed is calculated on a basis of the calculated target vehicle speed and an output of a vehicle speed detecting section. Then, when determining that the host vehicle speed is in an over-speed state, the host vehicle is controlled to be decelerated immediately before the host vehicle enters the curved road, the host vehicle is in a cruise (speed) control at a safe speed in a midway through the curved road, and the host vehicle speed is again controlled to be accelerated to a predetermined speed when the host vehicle is to run at an end (exit) of the curved road. Thus, the host vehicle can pass the curved road at an optimum speed.

SUMMARY OF THE INVENTION

It is an object of the present invention to provide vehicular running control apparatus and vehicular running control method which can smoothly pass a curved road.

According to one aspect of the present invention, there is provided a vehicular running control apparatus, comprising: a curved road detecting section configured to detect a state of a curved road located in front of a running road on which the vehicle is running on a basis of an obtained navigation information; a target vehicle speed calculating section configured to calculate a target vehicle speed of the vehicle at the curved road on a basis of the state of the curved road detected by the curved road detecting section and a preset lateral acceleration set value of the vehicle; a navigation target deceleration calculating section configured to calculate a navigation target deceleration at a present running position of the vehicle on a basis of the target vehicle speed calculated by the target vehicle speed calculating section; a yaw rate detecting section configured to detect a yaw rate and provide the detected yaw rate; a yaw rate target deceleration calculating section configured to calculate a yaw rate target deceleration of the vehicle on a basis of the yaw rate detected by the yaw rate detecting section and the lateral acceleration set value; a target deceleration selecting section configured to compare the yaw rate target deceleration calculated by the yaw rate target deceleration calculating section with the navigation target deceleration calculated by the navigation target deceleration calculating section to select the target deceleration from one of the yaw rate and navigation target decelerations which is lower than the other; and a target vehicle speed command value calculating section configured to calculate a target vehicle speed command value on a basis of the target deceleration selected by the target deceleration selecting section.

According to another aspect of the present invention, there is provided a vehicular running control method, comprising: detecting a state of a curved road located in front of a running road on which the vehicle is running on a basis of an obtained navigation information; calculating a target vehicle speed of the vehicle at the curved road on a basis of the detected state of the curved road and a preset lateral acceleration set value of the vehicle; calculating a navigation target deceleration at a present running position of the vehicle on a basis of the calculated target vehicle speed; detecting a yaw rate and provide the detected yaw rate; calculating a yaw rate target deceleration of the vehicle on a basis of the detected yaw rate and the lateral acceleration set value; comparing the yaw rate target deceleration with the navigation target deceleration to select the target deceleration from one of the yaw rate and navigation target decelerations which is lower than the other; and calculating a target vehicle speed command value on a basis of the selected target deceleration.

According to a still another aspect of the present invention, there is provided a vehicular running control method, comprising: detecting a state of a curved road located in front of a running road on which the vehicle is running on a basis of an obtained navigation information; calculating a target vehicle speed of the vehicle at the curved road on a basis of the detected state of the curved road and a preset lateral acceleration set value of the vehicle; calculating a navigation target deceleration at a present running position of the vehicle on a basis of the calculated target vehicle speed; detecting a yaw rate and provide the detected yaw rate; calculating a yaw rate target deceleration of the vehicle on a basis of the detected yaw rate and the lateral acceleration set value; determining whether the vehicle is to run or not to run on an entrance or exit of the curved road; when determining that the vehicle is to run on the entrance or exit of the curved road, comparing the yaw rate target deceleration with the navigation target deceleration to select the target deceleration from one of the yaw rate and navigation target decelerations which is lower than the other; and calculating a target vehicle speed command value on a basis of the selected target deceleration.

DETAILED DESCRIPTION OF THE INVENTION

Reference will hereinafter be made to the drawings in order to facilitate a better understanding of the present invention.

First Embodiment (Structure)

Figure 1:
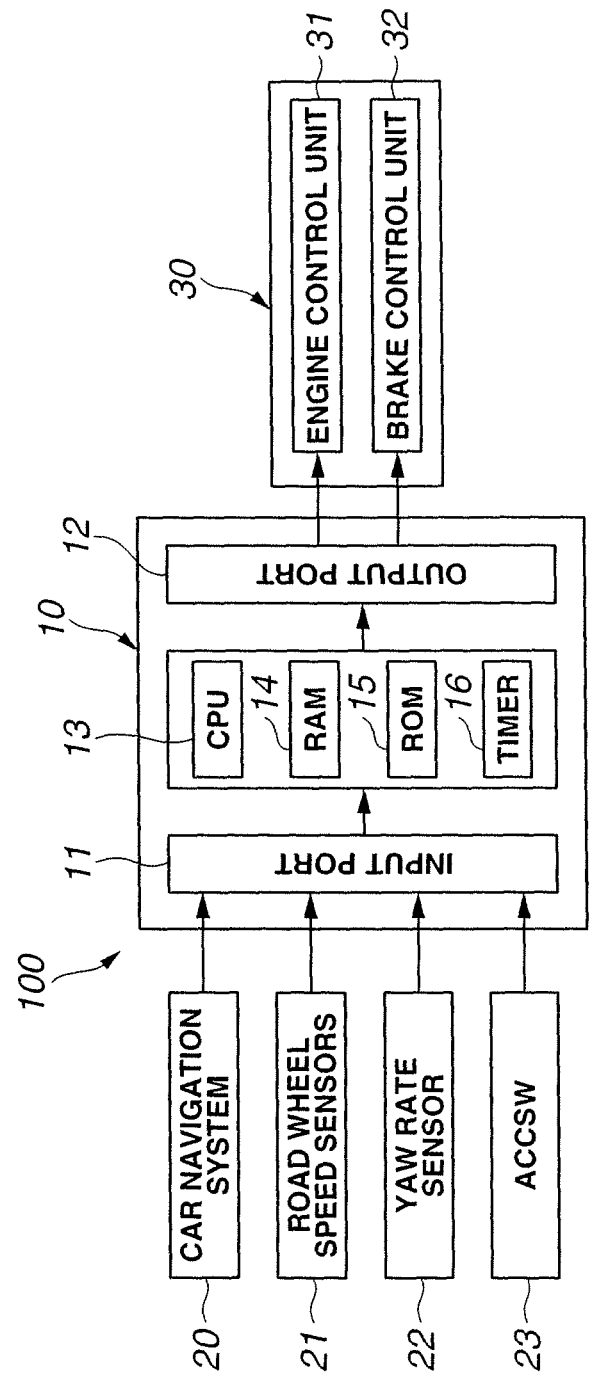
FIG. 1 shows a block diagram representing a basic concept of a vehicular running control apparatus according to the present invention.

FIG. 1 shows a vehicular running control apparatus 100 in a first preferred embodiment according to the present invention. As shown in FIG. 1, this vehicular running control apparatus 100 mainly includes: a controller 10; a car navigation system 20; road wheel speed sensors (vehicle speed detecting (section) means) 21; a yaw rate sensor (yaw rate detecting (section) means) 22; an ACCSW (Adaptive Cruise Control Switch) 23; and an acceleration/deceleration control device (acceleration/deceleration (or deceleration) control means) 30.

First of all, this controller 10 is constituted by an information processing system (a microcomputer system) having an input port 11, an output port 12, a CPU (Central Processing Unit) 13, a RAM (Random Access Memory) 14, a ROM (Read Only Memory) 15, and a timer 16. This controller 10 inputs output signals from external devices such as car navigation system 20, road wheel speed sensors 21, yaw rate sensor 22, and ACCSW 23 and performs a calculation processing for the input signals. Then, controller 10 outputs results of the calculation processing to acceleration/deceleration control device 30 constituted by an engine control unit 31, a brake control unit 32, and so forth via output port 12 to compositely control these units.

Next, car navigation system 20 has the same function and the same structure as those of a well known car navigation system. That is to say, this car navigation system 20 detects a present running position of the vehicle (the vehicle is also called a host vehicle in which vehicular running control apparatus 100 is mounted) according to a GPS (Global Positioning System) function and a road map information stored in a large capacity storage medium such as CD-ROM (Compact Disc Read Only Memory), DVD-ROM (Digital Versatile Disk Read Only Memory), and HDD (Hard Disk Drive). Thereafter, this car navigation system calculates an optimum running route from the present running position to a final destination position to guide the host vehicle. Then, this car navigation system 20 supplies various kinds of navigation information including a node information of the running position of the host vehicle and a curved road located in front of a running road on which the host vehicle is running from its road map information and its running road route information to controller 20. Road wheel speed sensors 21 are equipped on front and rear road wheels of the host vehicle and measure road wheel speed pulses related to revolutions of the front and rear road wheels. The measured road wheel speed signals are, at any time, inputted to controller 10.

Yaw rate sensor 22 detects a yaw rate developed on the host vehicle and similarly to supply a detected yaw rate value to controller 10 at any time. ACCSW 23 is an operation switch to operate vehicular running control apparatus 100 and so forth and, for example, is attached onto a steering wheel of the host vehicle or onto an instrument panel of the host vehicle. Then, ACCSW 22 serves to detect a switched state thereof and to supply a corresponding detection (switch state) signal to controller 10 at any time.

Acceleration/deceleration control device 30 serves to perform an automatic deceleration control on a basis of a deceleration controlled variable received from controller 10. It should be noted that the deceleration control uses either one of brake control unit 32 and engine control unit 31.

Figure 2:
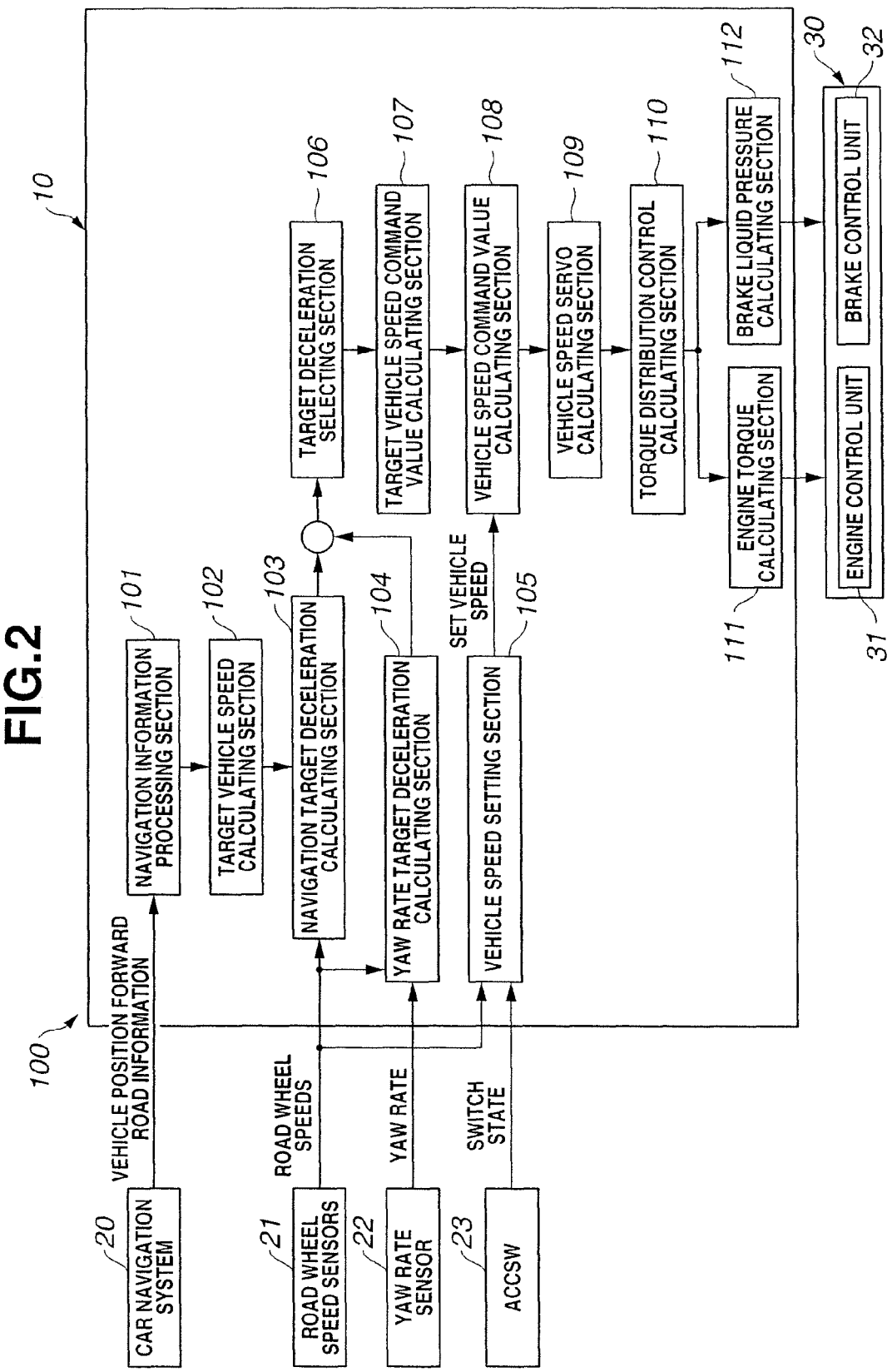
FIG. 2 shows a functional block diagram representing functions of the vehicular running control apparatus according to the present invention shown in FIG. 1.

FIG. 2 shows a functional block diagram representing detailed functions of controller 10 functioning on a basis of input signals of each system and device described above. As shown in FIG. 2, this controller 10 achieves each function of a navigation information processing section 101, a target vehicle speed calculating section 102, a navigation target deceleration calculating section 103, and a yaw rate target deceleration calculating section 104 (as will be described later) through the information processing system. In addition, this controller 10 achieves each function of a vehicle speed setting section 105, a target deceleration selecting section 106, a target vehicle speed command value calculating section 107, and a vehicle speed command value calculating section 108 (as will be described later) through the information processing system. Furthermore, controller 10 achieves each function of a vehicle speed servo calculating section 109, a torque distribution control calculating section 110, an engine torque calculating section 111, and a brake liquid pressure calculating section 112 (as will be described later) through the information processing system described above.

Navigation information processing section 101 detects presence or absence of a (forward) curved road from a node point (a nodal point or simply referred to as a node) located in front of a running road of the host vehicle and a value related to a curved road state such as a radius of turn at each node (point) of the detected curved road and a direction of turn thereat from the node (point) located in front of the running road on a basis of the navigation information obtained from car navigation system 20. This navigation information processing section 101, then, outputs the detected value to target vehicle speed calculating section 102. It should be noted that the navigation information obtained from car navigation system 20 includes a node information (road map information) and so forth. Target vehicle speed calculating section 102 sets a target vehicle speed of the curved road or at each node (point) of the curved road located in front of the host vehicle and its forward road of the curved road on the basis of the value related to the curved road state such as the radius of turn and the direction of turn at each node (point) on the curved road located in front of the host vehicle calculated by navigation information processing section 101 as described above. Then, this target vehicle speed calculating section 102 outputs the set value of the target vehicle speed to navigation target deceleration calculating section 103.

Navigation target deceleration calculating section 103 calculates the target deceleration at each node (point) on the curved road located in front of the running road on which the host vehicle is running and its forward road of the curved road on the basis of the target vehicle speed at each node (point) described above and the vehicle speed obtained from road wheel speed sensors 21 set by target vehicle speed calculating section 102 and the vehicle speed obtained from road wheel speed sensors 21 to satisfy the target vehicle speed at each node (point) of the curved road and its forward road described above. This navigation target deceleration calculating section 103 detects a minimum node (point) and a minimum value of the navigation target deceleration from among the calculated target decelerations at respective nodes described above and outputs the detected minimum node point and the minimum value target deceleration to target deceleration selecting section 106.

On the other hand, yaw rate target deceleration calculating section 104 calculates a lateral acceleration estimated value on a basis of the vehicle speed obtained from road wheel speed sensors 21 and the yaw rate value obtained from yaw rate sensor 22. Then, this yaw rate target deceleration calculating section 104 calculates an autonomous control purpose target deceleration (yaw rate target deceleration) a basis of the calculated lateral acceleration estimated value and an autonomous control purpose lateral acceleration set value and outputs the calculated autonomous control purpose target deceleration to target deceleration selecting section 106.

Vehicle speed setting section 105 sets the vehicle speed to perform a cruise (speed) control from a state of the vehicle or steering wheel of the vehicle obtained from ACCSW 23 the vehicle speed of the host vehicle obtained from road wheel speed sensors 22 and outputs the set vehicle speed to vehicle speed command value calculating section 108. Target deceleration selecting section 106 compares the navigation target deceleration calculated by navigation target deceleration calculating section 103 on a basis of the navigation information with the yaw rate target deceleration calculated by yaw rate target deceleration calculating section 104 on a basis of the yaw rate value obtained from yaw rate sensor 22 and so forth to perform a selection of the target deceleration from one of navigation target deceleration and the yaw rate target deceleration which is lower than the other (so-called, performing a select low). Then, this target deceleration selecting section 106 outputs the selected target deceleration to target vehicle speed command value calculating section 107.

Target vehicle speed command value calculating section 107 calculates the target vehicle speed command value to which a variation quantity (rate) limiter of the deceleration is added on a basis of the target deceleration obtained by target deceleration selecting section 106 and outputs the target vehicle speed command value to vehicle speed command value calculating section 108. Vehicle speed command value calculating section 108 selects the vehicle speed command value on a basis of the target vehicle speed command value calculated at target vehicle speed command value calculating section 107 and the set vehicle speed set by vehicle speed setting section 105 and outputs the selected vehicle speed command value to vehicle speed servo calculating section 109. Vehicle speed servo calculating section 109 performs a driving/braking control for the (host) vehicle in order for the vehicle to reach to the vehicle speed command value calculated by vehicle speed command value calculating section 108. This vehicle speed servo calculating section 109 calculates a target acceleration/deceleration to achieve this vehicle speed command value and outputs this target acceleration/deceleration to torque distribution control calculating section 110 in order to perform a torque distribution in accordance with the target acceleration/deceleration.

Torque distribution control calculating section 110 calculates a torque distribution control value of an engine torque and a brake torque in accordance with the target acceleration/deceleration calculated by vehicle speed servo calculating section 109. Then, this torque distribution control calculating section 110 outputs the torque distribution control value to engine torque calculating section 111 and brake liquid pressure calculating section 112, respectively.

Engine torque calculating section 111 calculates the engine torque through an opening angle of a throttle valve to achieve the torque at the engine side distributed by torque distribution control calculating section 110 and outputs its command value to engine control unit 31 of acceleration/deceleration control device 30.

Brake liquid pressure calculating section 112 calculates the brake liquid pressure command value to achieve the torque at the brake side distributed by torque distribution control calculating section 110 and outputs its command value to brake control unit 32 of acceleration/deceleration control device 30.

In details, this controller 10 calculates the radius of turn of the forward curved road located in front of the vehicle on a basis of the position of the host vehicle and nodes (node points) included in the navigation information from car navigation system 20. Next, controller 10 sets the target vehicle speed at each of the nodes (node points) on a basis of the calculated radius of turn at each of the nodes (node points) and the preset lateral acceleration and calculates the target deceleration at each of the set node points on a basis of the target vehicle speed at each of the node points (nodes) and the vehicle speed provided from road wheel speed sensors 21. Then, controller 10 detects the minimum value from among the target deceleration at each of the set nodes (node points) and sets node point and target deceleration which are objects to be controlled. Then, controller 10 calculates the target vehicle speed command value to achieve the target vehicle speed at the node (point) which is the object to be controlled. At the same time, controller 10 calculates the lateral acceleration estimation value on a basis of the yaw rate value obtained from yaw rate sensor 22 and calculates the yaw rate (control purpose) target deceleration from the lateral acceleration estimation value and the preset (yaw rate control purpose) lateral acceleration set value.

Then, controller 10 performs the select low calculation for the target deceleration calculated on a basis of the navigation information from navigation system 20 and the yaw rate control purpose target deceleration calculated on a basis of the yaw rate value from yaw rate sensor 22. Thereafter, controller 10 calculates the target vehicle speed command value to achieve the target vehicle speed at the node (point) which is the object to be controlled on a basis of the selected target deceleration and calculates an acceleration/deceleration controlled variable to calculate the target vehicle speed command value. Controller 10 outputs the calculated acceleration/deceleration controlled variable to acceleration/deceleration control device 30. Thus, even if the deceleration control based on the navigation information is activated and, thereafter, the deceleration control based on the yaw rate is activated as will be described later, an abrupt variation of the acceleration/deceleration can be prevented and the host vehicle can smoothly pass the curved road without giving an unpleasant jerky feeling to the vehicle driver.

(Operation)

Figure 3:
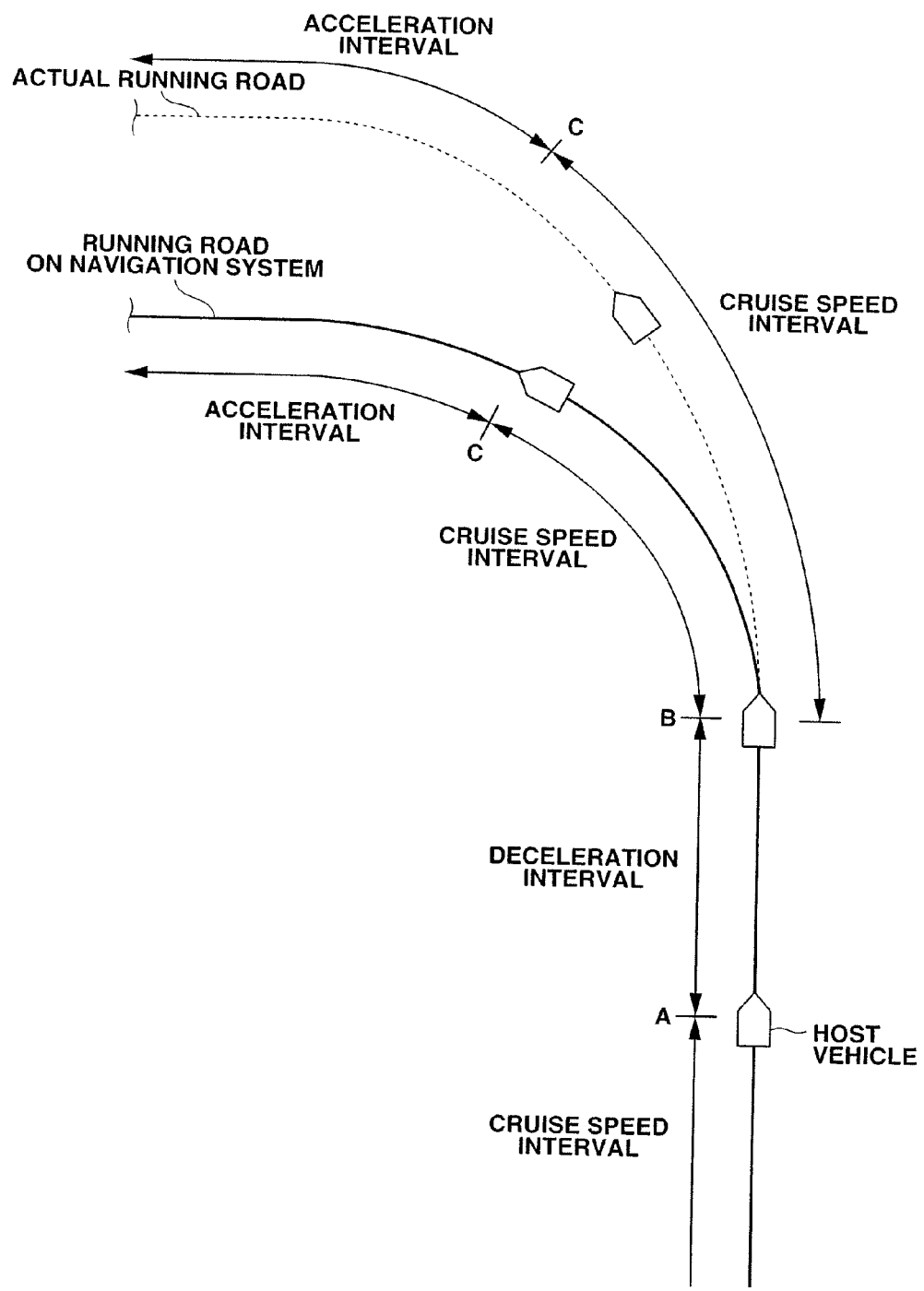
FIG. 3 shows a schematic view representing a relationship between a navigation information based running road on which a host vehicle, in which the vehicular running control apparatus according to the present invention is mounted, and an actual running road of the host vehicle on which the host vehicle is actually running.

Hereinafter, a specific example of the vehicular running control method using vehicular running control apparatus 100 related to the first embodiment according to the present invention (namely, a first preferred embodiment of a vehicular running control method) will be described with reference to FIGS. 3, 4, and 5. FIG. 3 shows a relationship between the running road of the host vehicle based on the navigation information described before and an actual running road on which the host vehicle is actually running. That is to say, FIG. 3 shows a state in which an information (node (point) information) of the running road (denoted by a solid line) of the host vehicle detected on a basis of the navigation information (also called, a navigation based running road) is deviated toward an inner peripheral side of the curved road with respect to the actual running road (denoted by a dot line) on which the host vehicle is actually running.

Figure 4:
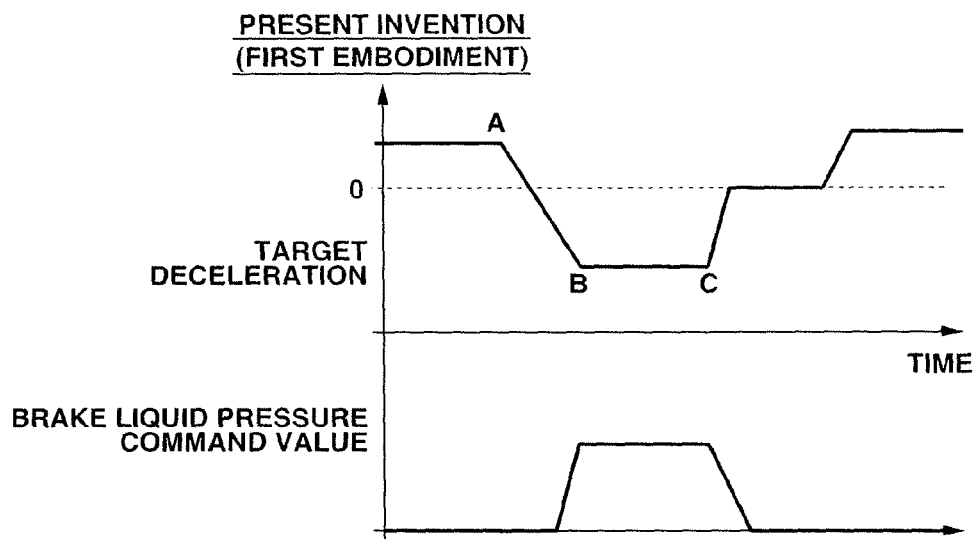
FIG. 4 is a characteristic graph representing time variations of a target deceleration and a brake liquid pressure command value in a first preferred embodiment of the vehicular running control apparatus according to the present invention.
Figure 5:
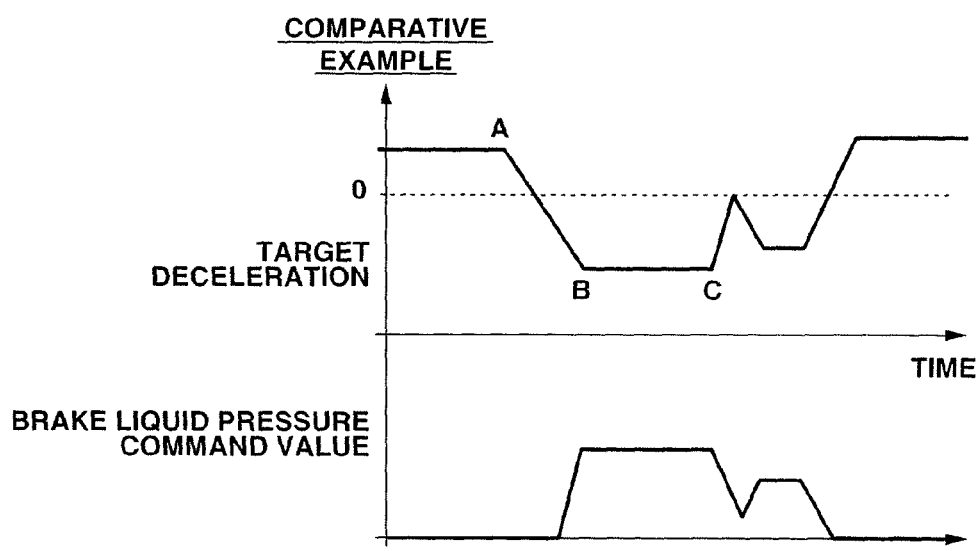
FIG. 5 is a characteristic graph representing time variations of the target deceleration and the brake liquid pressure command value in a comparative example to the first embodiment (the present invention) of the vehicular running control apparatus.

In addition, FIGS. 4 and 5 show relationships between the target deceleration calculated by controller 10 and a (brake) liquid pressure command value carrying out the deceleration control for the vehicle in the case of the first embodiment and in the case of a comparative example to the first embodiment.

The comparative example as shown in FIG. 5 corresponds to a previously proposed vehicular running control apparatus. First of all, as the running control at the curved road (supposing that the radius of turn thereof is constant) based on the navigation information, the host vehicle is running on a straight line interval which is sufficiently ahead (as viewed from the host vehicle) of the curved road as shown in FIG. 3 in a cruise (speed) control (in a constant vehicle speed within a predetermined statutory speed). However, in a straight line interval from a point A ahead of the curved road to an entrance (point B) of the curved road, the host vehicle is sufficiently decelerated to a vehicle speed at which the host vehicle can safely be entered into the curved road (a deceleration interval).

Then, the control is continued in such a way that if the host vehicle enters the curved road constantly at a sufficiently decelerated speed, the host vehicle passes the curved road maintaining the entered speed (a cruise (speed) interval) and, at a point of place (point C) near to an end (exit) of the curved road, the host vehicle is accelerated to the predetermined statutory speed of the subsequent straight line interval (an acceleration interval). It should be noted that, in a case where the radius of turn, a magnitude of the radius of turn, or so forth is different between the actual running road and the navigation based running road, the acceleration is started at the time point at which the host vehicle has reached to an acceleration start point of place (point C) which is the end of the curved road. However, in an actual matter of fact, the host vehicle does not yet reach to the acceleration start point of place (point C) as shown in FIG. 3. Thus, in a case where this acceleration control is started, the vehicle driver carries out an operation for the vehicle such as a steering operation of the steering wheel of the vehicle in an inner peripheral direction of the curved road (a counterclockwise direction as viewed from a driver's seat of the vehicle in the case of FIG. 3) in order to correct the position of the host vehicle in a case where the acceleration control described above has been started.

At this time, since the yaw rate of the host vehicle is varied according to the steering operation as described above, in the comparative example (refer to FIG. 5) to the first embodiment, a yaw rate control based on the yaw rate information is intervened to be acted upon the vehicle to reduce the target deceleration as shown in FIG. 5. Therefore, in the comparative example, the intervention of the deceleration control upon (after) the start of the acceleration as shown in FIG. 5 results in a large unpleasant feeling in a jerky manner given to an (vehicle) occupant. In addition, a variation of the brake liquid pressure command value of acceleration/deceleration control device 30 to achieve this acceleration/deceleration control provides such a shape as two mountains standing in line as shown in FIG. 5.

Whereas, in the case of the vehicular running control method related to the first embodiment, when the yaw rate is varied, as shown in FIG. 4, the target deceleration is not varied but is controlled to indicate zero (0). Therefore, the host vehicle is neither accelerated nor decelerated and is running in a state in which the host vehicle is kept constant at the instantaneous vehicle speed. In addition, the variation of the brake liquid pressure command value of acceleration/deceleration control device 30 to achieve this control provides such a shape as a first mountain being converged into zero. Thus, since an abrupt deceleration of the host vehicle immediately after the acceleration or such a phenomenon as two-stage decelerations in a midway through the curved road can be avoided. Consequently, the host vehicle cannot give the unpleasant feeling in the jerky manner to the vehicle occupant.

Figure 6:
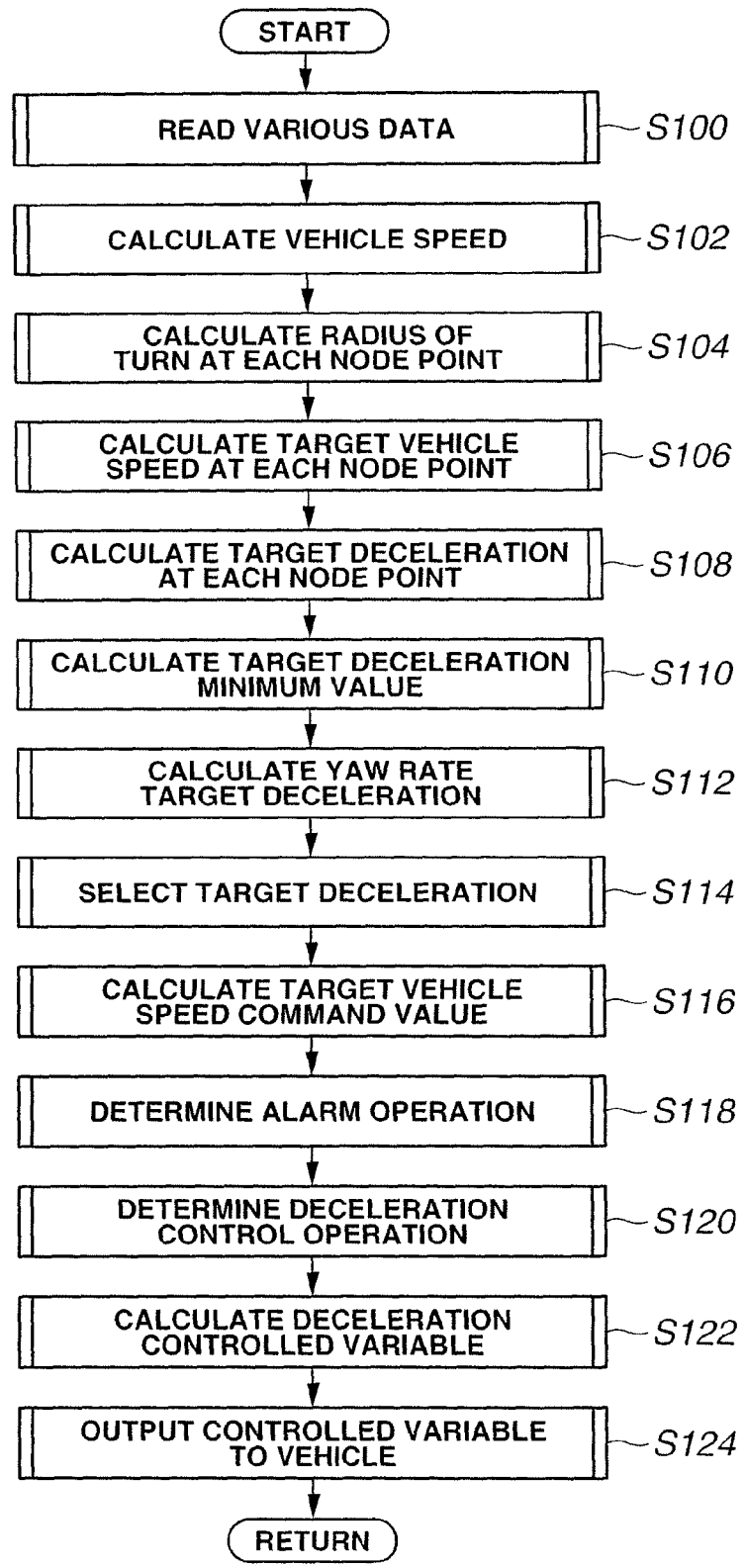
FIG. 6 is a flowchart representing a procedure to be executed in a controller of the vehicular running control apparatus representing a first preferred embodiment of a vehicular running control method according to the present invention.
Figure 7:
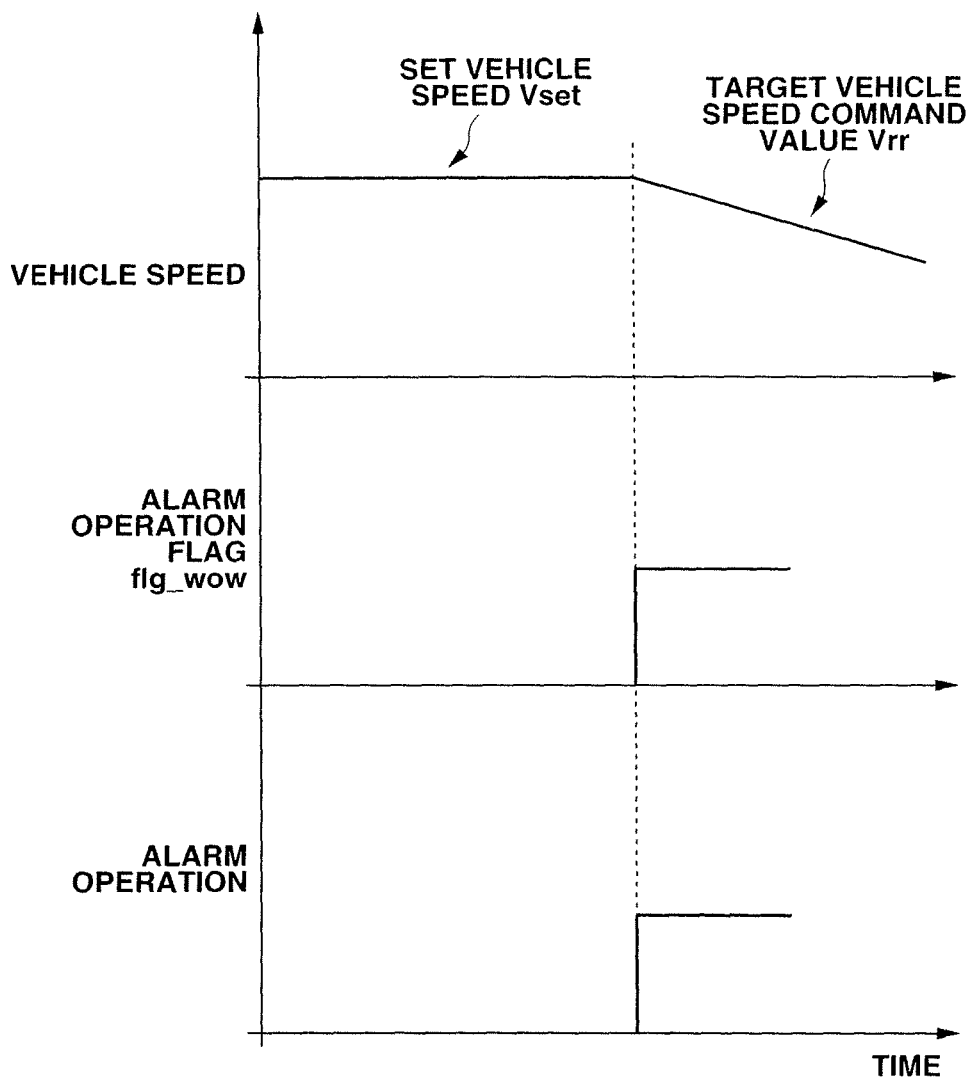
FIG. 7 is a timing chart representing a relationship between a target vehicle speed command value and an alarm operation in the case of the first embodiment of the vehicular running control method according to the present invention shown in FIG. 6.
Figure 8:
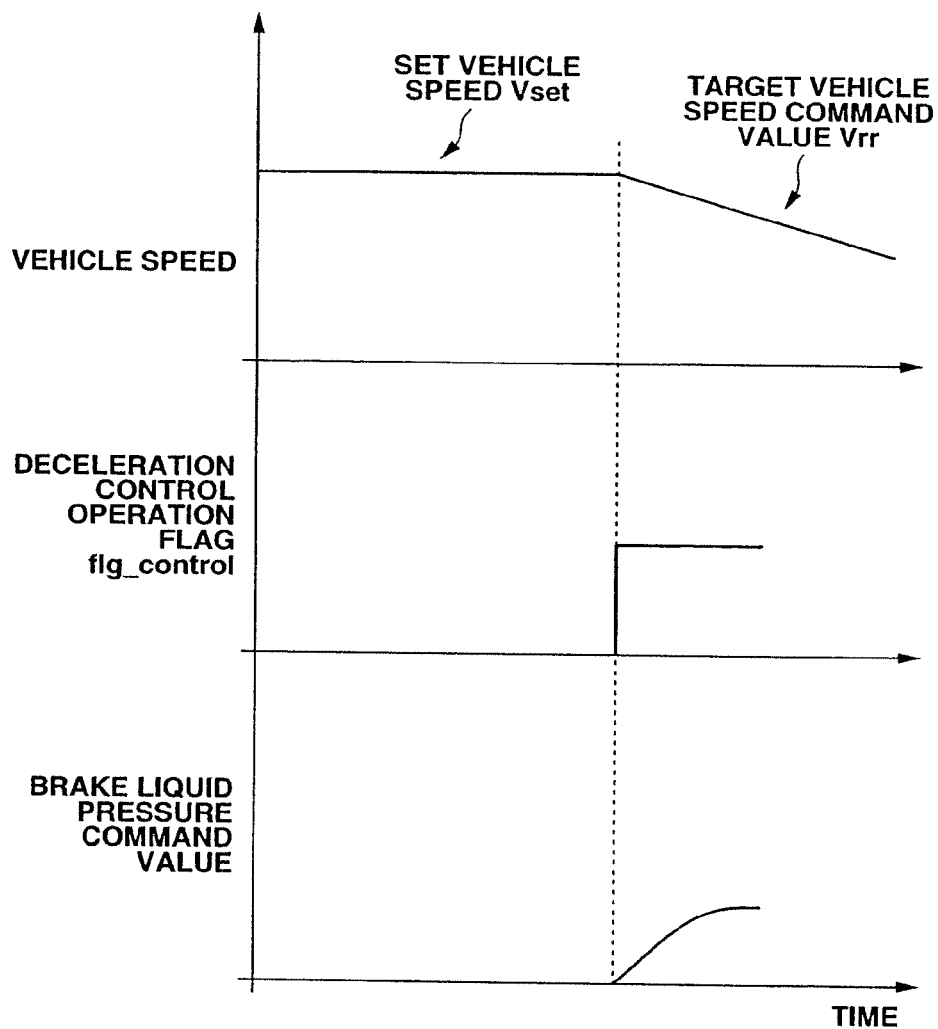
FIG. 8 is a timing chart representing a relationship among the target vehicle speed command value, the brake liquid pressure command value, and so forth in the case of the first embodiment of the vehicular running control method shown in FIG. 6.

FIGS. 6 through 8 show the specific example of the vehicular running control method using vehicular running control apparatus 100 as described above. First of all, FIG. 6 shows a flowchart representing the first embodiment of the vehicular running control method. It should be noted that each step of S100 through S124 is continuously executed at a constant interval of time on a basis of a number of clocks by means of timer 16 incorporated into controller 10. That is to say, CPU 13 of this controller 10 performs a loading of a program to achieve the function of each of the above-described sections at the same time as a power supply to the vehicle (a vehicle activation) and, thereafter, at the first step of S100, CPU 13 of controller 10 reads various data inputted from respective sensors and the system via input port 11. Thereafter, controller 10 executes repeatedly predetermined processes at the constant interval of time while the steps after step S102 are sequentially executed.

(Step S100)

First, as the read processing of various kinds of data at first step S100, specifically, controller 10 reads each road wheel speed $Vw_i$ (i=1 through 4) from road wheel speed sensors 21, an accelerator opening angle ACL, lateral acceleration set value Yg*, switch state (switch state signals) (MAIN, RES, SET, or so forth) of ACCSW 23 attached onto the steering wheel of the host vehicle, the navigation information from car navigation system 20, and so forth. It should be noted that a specific example of the navigation information includes the host vehicle present (running) position (X, Y), node (point) information $(X_j, Y_j, L_j, Branch_j)$ related to each node (point) $N_j$ (j=1 through n, n denotes an integer) located in front of the host vehicle, and so forth. It should be noted that, from among this node (point) information, $X_j, Y_j$ denotes coordinates of a certain node (point), $L_j$ denotes a distance information from the position of the host vehicle (X, Y) to position $(X_j, Y_j)$ of the certain node (point), and $Branch_j$ denotes a branch road information. For example, $Branch_1$ means that a number one node (point) $(X_1, Y_1)$ is a point of place on a number one branch road, $Branch_2$ means that one forwardly located node (point) $(X_2, Y_2)$ is a point of place on a number two branch road, and so forth It should also be noted that the relationship between each of nodes (node points) $N_j$ (j=1 through n) is such that, as a value of j of node (point) $N_j$ becomes larger, the corresponding node (point) becomes more remote from the position of the host vehicle.

(Step S102)

At step S102, controller 10 calculates vehicle speed V of the host vehicle itself. In this embodiment, during an ordinary run, in a case where the host vehicle is a rear wheel drive vehicle, vehicle speed V of the host vehicle is calculated as an average of front road wheel vehicle speeds $Vw_1$ and $Vw_2$ is calculated.

$$V=(Vw_1+Vw_2)/2 \quad (1)$$

It should be noted that, in a case where a control system using the vehicle speed used control such as ABS (Anti-locked Braking System) control is operated, the vehicle speed (an estimated vehicle speed) used in such a system as described above is used.

(Step S104)

At step S104, controller 10 calculates a radius of turn $R_j$ at each node (point) $N_j$ on a basis of the node information of the navigation information read at first step S100. It should be noted that, although calculation methods of radius of turn $R_j$ itself have been proposed heretofore, radius of turn $R_j$ on a basis of, for example, a generally available point of triangulation is calculated. In addition to the calculation of radius of turn $R_j$ at each node (point) $N_j$, interpolation points are prepared at equal intervals so as to pass respective nodes (node points) $N_j$ and radius of turn $R_j$ at each of the interpolation points may be calculated.

(Step S106)

At step S106, controller 10 calculates the target vehicle speed at each of nodes (node points) $N_j$. Specifically, the target vehicle speed is prepared on a basis of radius of turn $R_j$ at each of previously obtained nodes (node points) $N_j$ and lateral acceleration set value Yg* which is, for example, a predetermined value such as 0.3 G. Lateral acceleration set value Yg* may be the lateral acceleration arbitrarily set by the vehicle driver. Target vehicle speed $Vr_j$ at each of nodes (node points) $N_j$ can be calculated from the following equation (2).

$$Vr_j^2 = Yg^* \times |R_j| \quad (2)$$

According to equation (2), as radius of turn $R_j$ becomes larger, target vehicle speed $Vr_j$ becomes larger. It should be noted that the target vehicle speed is set for each of the nodes (node points) at step S106 but the target vehicle speed at the corresponding interpolation point may be calculated with the interpolation points at the equal intervals prepared so as to pass each of the nodes (node points) in the same way as step S104.

(Step S108)

At step S108, controller 10 calculates the target deceleration at each of the nodes (node points). Specifically, controller 10 calculates target deceleration $Xgs_j$ at each of the nodes (node points) according to the following equation (3) using previously derived vehicle speed V, target vehicle speed $Vr_j$ at each of the nodes (node points), and distance $L_j$ from the present (running) position of the host vehicle to each of the nodes (node points).

$$Xgs_j = (V^2 - Vr_j^2)/(2 \times L_j) = (V^2 - Yg^* \times |R_j|)/(2 \times L_j) \quad (3)$$

It should be noted that a plus value of this target deceleration of $Xgs_j$ indicates the deceleration value and target deceleration $Xgs_j$ is calculated from vehicle speed V, target vehicle speed $Xr_j$, and distance $L_j$ from the present position of the host vehicle to each of nodes (node points). Specifically, as target vehicle speed $Vr_j$ and radius of turn $R_j$ become smaller or distance $L_j$ becomes smaller (shorter), target deceleration $Xgs_j$ becomes larger. In addition, at step S108, the target deceleration at each of the nodes (node points) is calculated using distance L to each of the nodes (node points). However, the target deceleration at each of the interpolation points may be calculated using the distances to the respective interpolation points plotted at equal intervals.

(Step S110)

At step S110, controller 10 calculates the minimum value of the target deceleration according to the following equation (4) to detect one of the node points which is the object to be controlled from among the target decelerations at respective nodes (node points). Specifically, controller 10 calculates minimum value Xgs_min of the target deceleration at each of the nodes (node points) calculated at step S108.

$$Xgs\_min = \min(Xgs_j) \quad (4)$$

(Step S112)

This step S112 and the subsequent step S114 are characteristic parts of the present invention. At step S112, controller 10 calculates the target deceleration from the yaw rate. Specifically, after the yaw rate developed on the vehicle body is measured and the lateral acceleration is estimated, controller 10 calculates yaw rate target deceleration Xgyaw* for the preset lateral acceleration set value Yg* in accordance with the following equation (5). It should herein be noted that preset lateral acceleration set value Yg* is set to, for example, 0.3 G.

$$Xgyaw^* = k(Yg^* - Yg) \qquad (5)$$

It should be noted that, in equation (5), k denotes a predetermined gain and this gain k may be modified according to, for example, a deviation between preset lateral acceleration set value Yg* and lateral acceleration estimated from the detected yaw rate Yg. In addition, in the first embodiment, the minimum value of yaw rate target deceleration Xgyaw* is set to "0" as in the following equation (6).

$$\min(Xgyaw^*) \geq 0 \qquad (6)$$

(Step S114)

Next, at step S114, controller 10 performs the select low calculation between yaw rate target deceleration Xgyaw* calculated at step S112 and minimum value Xgs_min of the target deceleration calculated by step S110 to derive a final target deceleration Xg*. That is to say, $$Xg^* = \min(Xgs\_min, Xgyaw^*) \qquad (7)$$

(Step S116)

At step S116, controller 10 calculates target vehicle speed command value Vrr to which the variation quantity (rate) limiter of the deceleration is added in accordance with the following equation (8) from final target deceleration Yg*.

$$Vrr = f(Xgs\_min \text{ or } Xgyaw^*) \times t \qquad (8)$$

It should be noted that, in equation (8), t denotes a time and the variation rate limiter (f) is set to, for example, 0.01 G/sec.

(Step S118)

At step S118, controller 10 carries out the alarm operation start determination. Specifically, controller 10 performs the alarm operation start determination using target vehicle speed command value Vrr calculated at step S116, vehicle speed V, and set vehicle speed Vset. For example, as shown in FIG. 7, in a case where set vehicle speed Vset=vehicle speed V, the alarm is activated when Vset=V>Vrr. Furthermore, an alarm operation flag flg_wow is set as flg_wow=1.

(Step S120)

At step S120, controller 10 performs the deceleration control operation flag determination. Specifically, controller 10 performs the deceleration operation start determination using target vehicle speed command value Vrr calculated at step S116, vehicle speed V, and set vehicle speed Vset. For example, as shown in FIG. 8, in a case where set vehicle speed Vset=vehicle speed V, the deceleration control is operated when Vset=V>Vrr. Furthermore, a deceleration control operation flag flg_control is set as flg_control=1.

(Step S122)

At step S122, controller 10 calculates the (acceleration/deceleration) controlled variable to achieve target vehicle speed command value Vrr calculated at step S116. The calculation of the controlled variable is carried out when deceleration control operation flag flg_control is set as flg_control=1. Torque distribution control calculating section 110 performs the torque distribution into the engine torque and the brake torque in accordance with the target deceleration calculated by vehicle speed servo calculating section 109 in order to achieve target vehicle speed command value Vrr calculated at step S116. Then, controller 10 outputs the throttle (valve) opening angle command value to achieve the distributed engine torque and the brake liquid pressure command value to achieve the distributed brake torque. For example, as shown in FIG. 8, the brake liquid pressure command value is outputted to operate the brake control when deceleration control operation flag flg_control is set as flg_control=1.

(Step S124)

At step S124, controller 10 is operated to perform the deceleration control (outputs the controlled variable to acceleration/deceleration control device 30 (the vehicle) and to cause the alarm to be outputted. A specific example of the alarming is an alarm sound and/or a display through a HUD (Head-Up Display) and a voice speech issued from a speaker of car navigation system 20, an image display from a monitor of car navigation system 20, and/or a meter display may be adopted.

(Advantage 1)

Since, in this embodiment, controller 10 selects the target deceleration from one of the target deceleration calculated on the basis of the navigation information and the target deceleration calculated from the yaw rate which is lower than the other, an abrupt variation in acceleration/deceleration during the run on the curved road can be prevented.

(Advantage 2)

In addition, in this embodiment, controller 10 sets the minimum value of the yaw rate target deceleration to be zeroed (0) when the yaw rate deceleration is selected to be lower than the navigation target deceleration at the selection process. Thus, even if the yaw rate target deceleration is operated after the navigation information based deceleration control is operated, the abrupt variation of the acceleration/deceleration can be prevented. Consequently, the host vehicle can smoothly pass the curved road without giving the vehicle occupant the unpleasant jerky feeling.

Second Embodiment

Next, a second preferred embodiment of the vehicular running control apparatus according to the present invention will be described below with reference to FIGS. 9 through 17.

Figure 9:
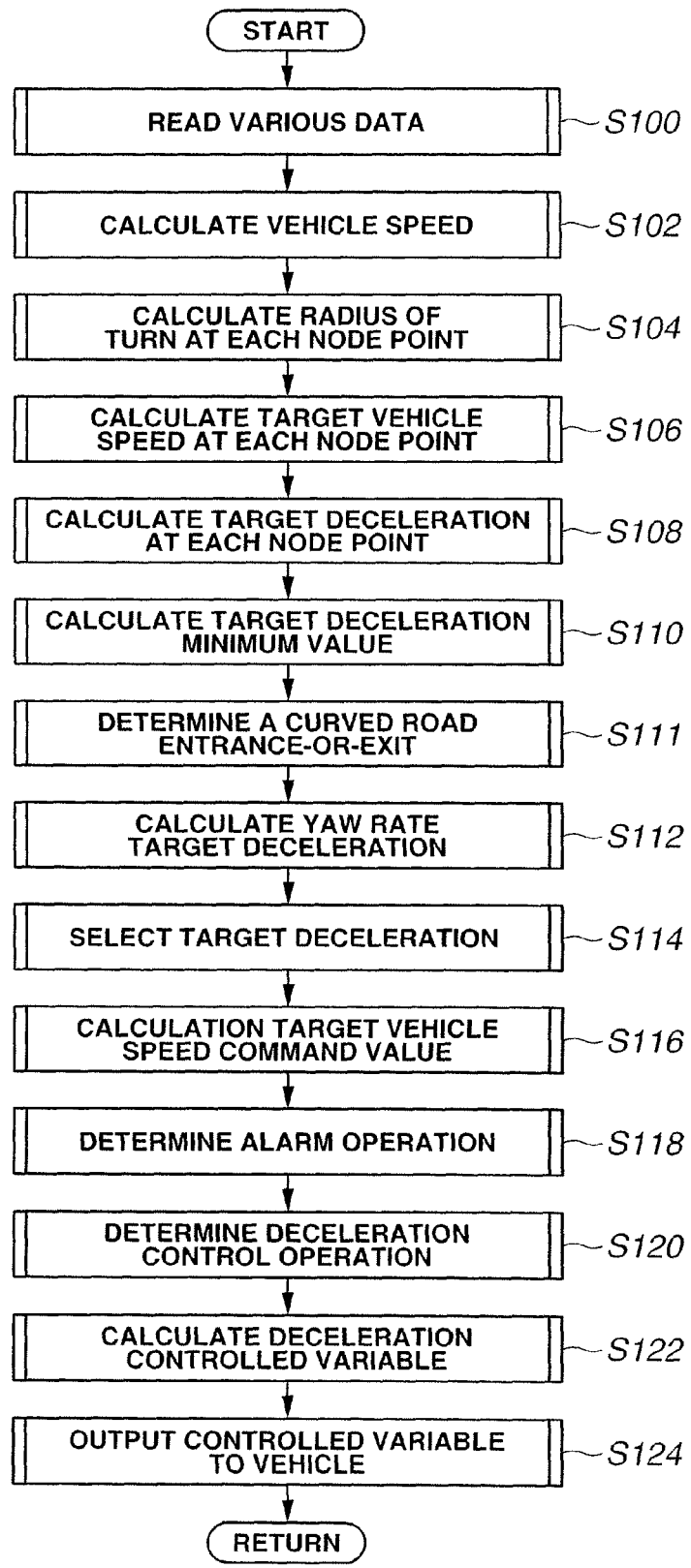
FIG. 9 is a flowchart representing a procedure to be executed in the controller of the vehicular running control apparatus in a second preferred embodiment as representing a second preferred embodiment of the vehicular running control method according to the present invention.

FIG. 9 shows a flowchart for explaining an operation of the second embodiment (a second preferred embodiment of the vehicular running control method) corresponding to FIG. 6 in the case of the first embodiment.

As shown in FIG. 9, the structure and a basic processing flow are the same as those described in the first embodiment. However, in the second embodiment, a curved road entrance-or-exit determination is made in addition to the processing in the first embodiment and, according to a result of the curved road entrance-or-exit determination, the yaw rate target deceleration is corrected.

That is to say, a curved road entrance-or-exit determining step S111 is added between target deceleration minimum value calculating step S110 and yaw rate target deceleration calculating step S112 and, in order to cope with this addition of the new step, the processes at step S112 and step S114 are slightly modified.

Hereinafter, these steps of S111 through S114 will be explained.

(Step S111)

Figure 10:
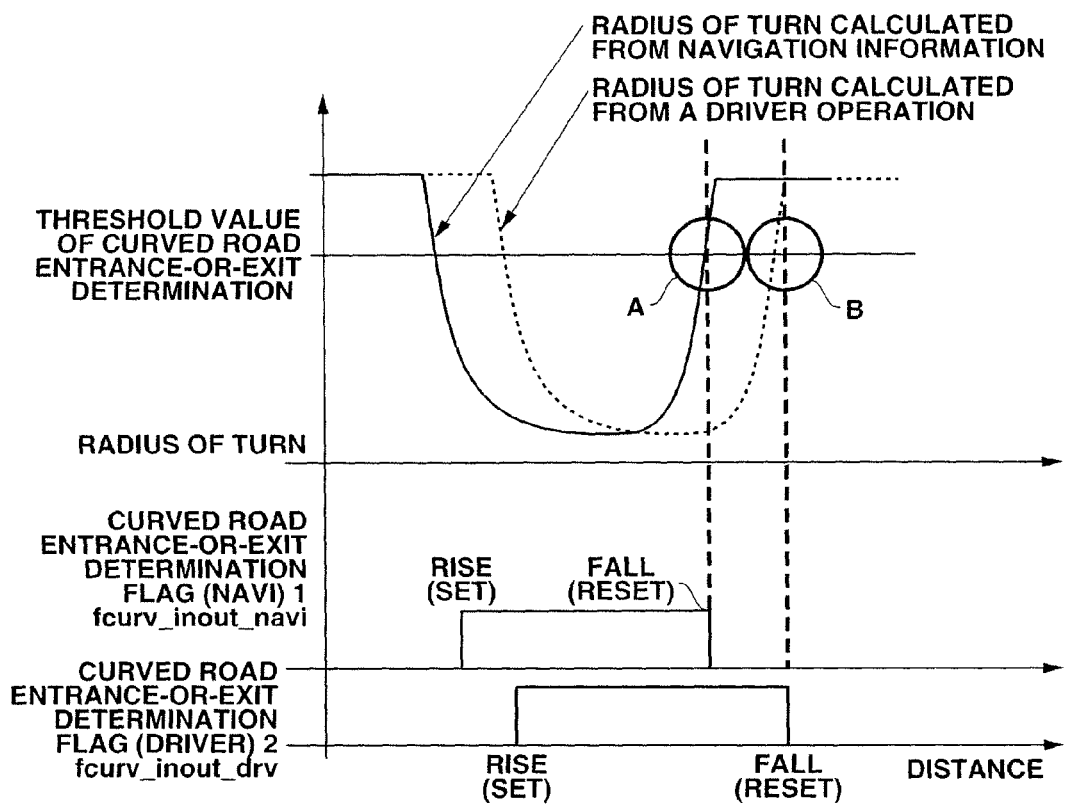
FIG. 10 is an explanatory view for explaining a relationship among a radius of turn calculated from a vehicle driver operation and the radius of turn calculated from a navigation information, a curved road entrance-or-exit determination threshold value, and curved road entrance-or-exit determination flags in the case of the second embodiment of the vehicular running control apparatus shown in FIG. 9.

That is to say, at this step, controller 10 performs the curved road entrance-or-exit determination of the curved road on which the host vehicle is to run. For example, the entrance or exit of the curved road is estimated from the radius of turn of the curved road calculated from the navigation information and the radius of turn calculated from a driver operation (for example, s steering operation of the steering wheel of the vehicle (to enter the curved road or to exit the curved road), as shown in FIG. 10. Specifically, a curved road entrance-or-exit determination threshold value is set to a certain predetermined value as shown in FIG. 10. It should be noted that the certain predetermined value is, for example, the radius of turn of the curved road 300R. Then, if the radius of turn (a solid line in FIG. 10) calculated from the navigation information is decreased and becomes lower than the curved road entrance-or-exit determination threshold value, a curved road entrance-or-exit determination flag 1 fcurv_inout_navi is set as fcurv_inout_navi=1. In addition, in a case where the radius of turn (a dot line in FIG. 10) calculated from the driver operation is decreased and becomes lower than the curved road entrance-or-exit determination threshold value, a curved road entrance-or-exit determination flag 2 fcurv_inout_drv is set as fcurv_i-nout_drv=1.

Thereafter, in a case where the radius of turn calculated from the navigation information is, in turn, increased becomes in excess of (larger than) the curved road entrance-or-exit determination flag 1 fcurv_inout_navi is reset as fcurv_inout_navi=0. In addition, if the radius of turn calculated from the driver ('s) operation is increased and becomes in excess of the road entrance-or-exit threshold value, curved road entrance-or-exit determination flag 2 fcuv_inout_drv is reset as fcurv_inout_drv=0. It should be noted that, in the second embodiment, the curved road entrance-or-exit determination threshold value is set and the curved road entrance-or-exit determination is performed for the radius of turn calculated from the driver's operation and the set threshold value. Hence, the curved road surface entrance-or-exit determining method is not limited to this and another method may be adopted. For example, curved road entrance-or-exit determination flag 2 fcurv_inout_drv may be set as fcurv_inout_drv=0 if the vehicle driver operates the steering wheel to return toward its neutral position for a predetermined time duration or in a case where the lateral acceleration (lateral G)) is transferred into a direction in which the yaw rate becomes smaller than a certain predetermined value within the predetermined time.

(Step S112)

At step S112, the same procedure as described in the first embodiment is carried out. That is to say, as described above, controller 10 calculates the yaw rate target deceleration estimated from the yaw rate estimated value. Specifically, after the lateral acceleration is estimated by measuring the yaw rate developed on the host vehicle, yaw rate target deceleration Xgyaw* is set in the following equation (5) for preset lateral acceleration (set) value Xg* (for example, 0.3 G).

$$Xgyaw^* = K(Yg^* - Yg) \quad (5)$$

In equation (5), K denotes the predetermined gain. Predetermined gain K may be modified in accordance with the deviation between lateral acceleration set value Yg* and lateral acceleration estimation value Yg. In addition, in the second embodiment, although the yaw rate developed on the vehicle is measured by yaw rate sensor 22, the yaw rate may be estimated from the steering angle of the steering wheel.

(Step S114)

At step S114, yaw rate target deceleration Xgyaw* calculated at previous step S112 is corrected by one of methods as will be described later and the select low calculation is performed for corrected yaw rate target deceleration (hereinafter, appropriately referred to as "corrected yaw rate target deceleration") XgyawI* and the minimum value Xgs_min of the target deceleration (hereinafter, appropriately referred to as "navigation target deceleration") calculated from the navigation information to derive final target deceleration Xg*.

$$Xg^* = \min(Xgs\_min, Xgyaw1^*) \quad (9)$$

Hereinafter, as the method of calculating corrected yaw rate target deceleration Xgyaw1* (the correction method of yaw rate target deceleration Xgyaw1* (the correction method of yaw rate target deceleration Xgyaw* calculated at step S112), the following three methods (first, second, and third calculation methods) are provided.

As the first calculation method, as shown in FIG. 10, at first, controller 10 detects a rising edge of each of navigation information based curved road entrance-or-exit determination flag 1 fcurv_inout_navi and driver operation based curved road entrance-or-exit determination flag 2 fcurv_inout_drv. Next, in a case where the turn of radius calculated from the driver's operation, as denoted by a dot line of FIG. 10, is increased and becomes in excess of the curved road entrance-or-exit determination threshold value, namely, controller 10 detects the falling edge of driver operation based determination flag 2 fcurv_inout_drv, yaw rate target deceleration Xgyaw* at that time is corrected to derive corrected yaw rate target deceleration Xgyaw1*.

The second calculation method includes: detections of the rising edges of navigation information based curved road entrance-or-exit determination flag 1 fcurv_inout_navi and those of driver operation based curved road entrance-or-exit determination flag 2 fcurv_inout_drv. Next, as shown in FIG. 10, the second calculating method is such that, in a case where the radius of turn calculated from the driver operation is not in excess of the curved road entrance-or-exit determination threshold value, in other words, even if the falling edge of driver operation based curved road entrance-or-exit determination flag 2 fcurv_inout_drv is not detected and, furthermore, corrected yaw rate target deceleration Xgyaw1* is calculated by correcting yaw rate target deceleration Xgyaw* in a case where yaw rate target deceleration Xgyaw* is equal to or larger than the predetermined value.

The third calculating method is such that, in a case where controller 10 detects rising edges of navigation information based curved road entrance-or-exit determination flag 1 fcurv_inout_navi and driver operation based curved road entrance-or-exit determination flag 2 fcurv_inout_drv, respectively. Next, yaw rate target deceleration Xgyaw* in a case where the radius of turn is not in excess of the curved road entrance-or-exit determination threshold value, in order words, the falling edge of driver operation based curved road entrance-or-exit determination flag 2 fcurv_inout_drv is not detected and yaw rate target deceleration Xgyaw* is equal to or lower than the predetermined value is corrected to calculate corrected yaw rate target deceleration Xgyaw1*. Hereinafter, these three calculation methods of calculating corrected yaw rate target deceleration XgyawI* will be explained below.

(First Calculation Method)

Figure 11:
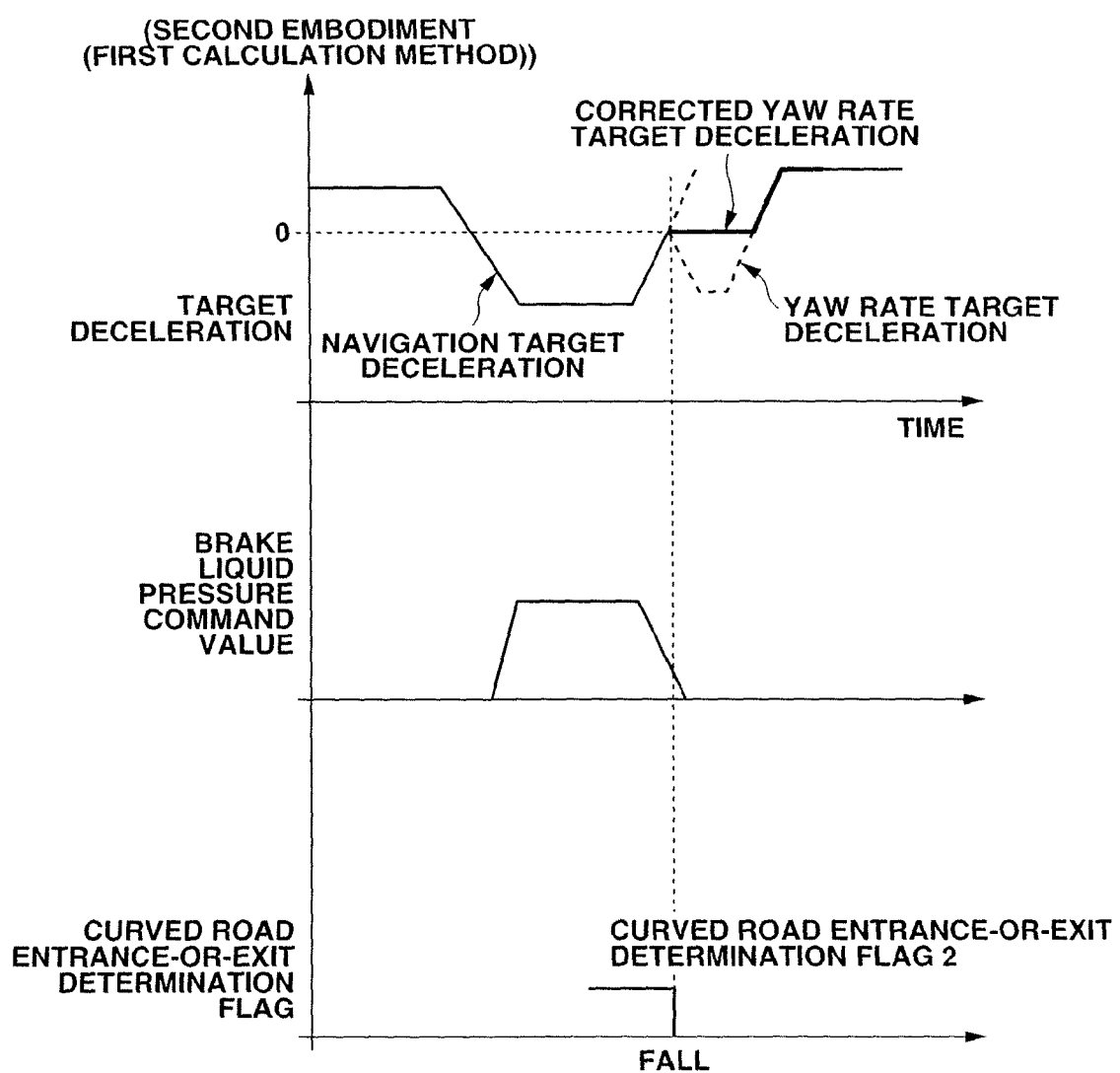
FIG. 11 is a characteristic graph representing time variations of the target deceleration, the brake liquid pressure command value, and a curved road entrance-or-exit flag, each of these value and flag being related to a first calculation method of a corrected yaw rate target deceleration command value in the second embodiment of the vehicular running control apparatus shown in FIG. 9.

First of all, in the first calculation method, yaw rate target deceleration Xgyaw* is substituted into corrected yaw rate target deceleration XgyawI* as in the following equation (10) when controller 10 detects the falling edge of driver operation based curved road entrance-or-exit determination flag 2 fcurv_inout_drv. Then, the minimum value of corrected yaw rate target deceleration Xgyaw1* is set in the following equation (11) or set to a predetermined value (in this embodiment, for example, 0 (zero)) as shown in FIG. 11.

$$XgyawI^* = Xgyaw^* \quad (10)$$

$$\min(XgyawI^*) \geq 0 \quad (11)$$

(Advantage 3)

In this way of the first calculation method, there is no possibility of becoming corrected yaw rate target deceleration Xgyaw1* below the predetermined value (0) even in a case where yaw rate target deceleration Xgyaw* is remarkably reduced. Consequently, the abrupt deceleration or two-stage deceleration can be avoided at the exit of the curved road or at the proximity to the ext of the curved road and a smooth run of the host vehicle at the curved road exit or at the proximity to the exit of the curved road can be achieved.

(Second Calculation Method)

Next, the second calculating method is an addition of the following steps S113-1, S113-2, and S113-2 between step S112 at which the yaw rate target deceleration shown in FIG. 9 is calculated and step S114 at which the select low calculation of the target deceleration is carried out.

(Step S113-1)

Figure 12:
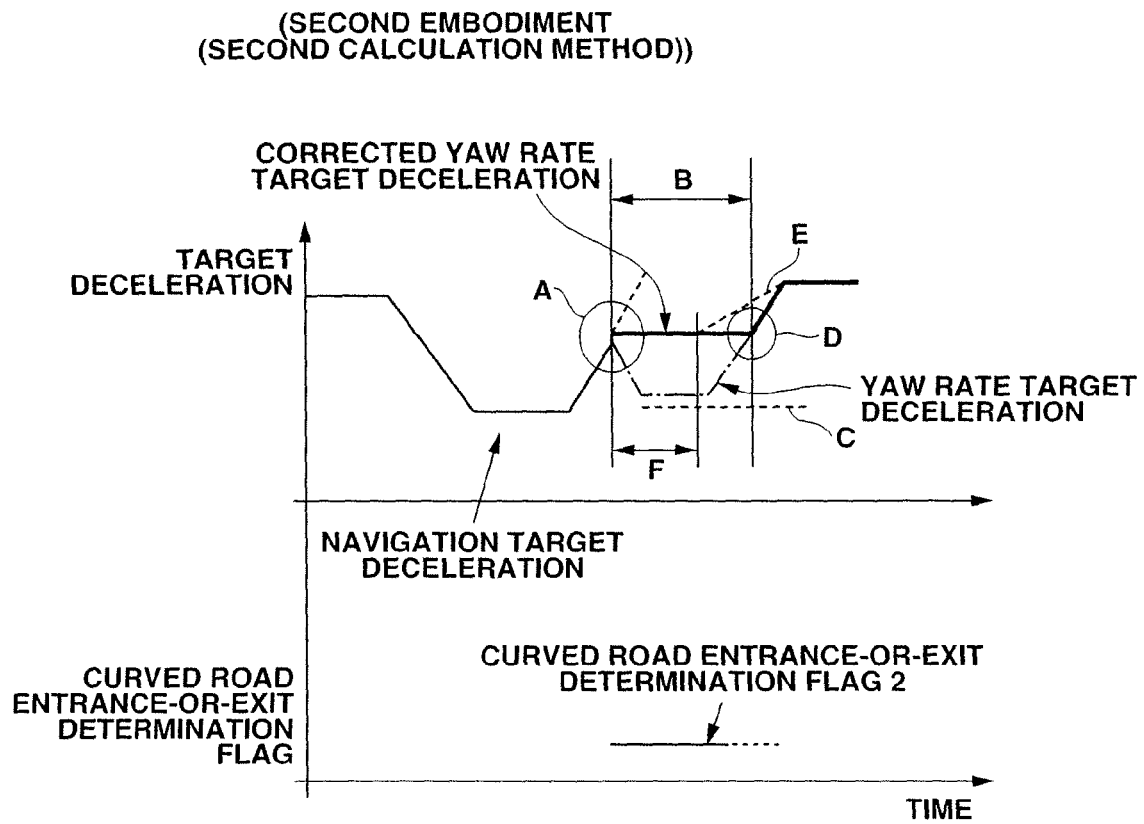
FIG. 12 is a characteristic graph representing time variations of the target deceleration, the brake liquid pressure command value, and a curved road entrance-or-exit flag, each of these value and flag being related to a second calculation method of the corrected yaw rate target deceleration command value in the second embodiment of the vehicular running control apparatus.

At this step S113-1, in a case where controller 10 does not yet detect the rising edge of curved road entrance-or-exit determination flag 2 fcurv_input_drv based on the driver's operation, as shown in FIG. 12, and in a case where yaw rate target deceleration Xgyaw* calculated at step S112 satisfies the following equation (12) for navigation target deceleration Xgs_min, navigation target deceleration at this time is corrected yaw rate target deceleration XgsyawI* and is set as in the following equation (13).

$$Xgs\_min > Xgyaw* \quad (12)$$

$$Xgyaw1* = Xgs\_min \quad (13)$$

(Step S113-2)

At step S113-2, controller 10 holds corrected yaw rate target deceleration Xgyaw1* set at step S113-1. For example, corrected yaw rate target deceleration Xgyaw1* is held until the following equation (14) is satisfied in which yaw rate target deceleration Xgyaw* is equal to or larger than corrected yaw rate target deceleration. Xgyaw1*.

$$Xgyaw1* \leq Xgyaw* \quad (14)$$

That is to say, in the second calculation method, the navigation target deceleration when the yaw rate target deceleration becomes smaller than the navigation target deceleration as shown in a point A of FIG. 12 is set as the corrected yaw rate target deceleration. Then, in a range B of FIG. 12, corrected yaw rate target deceleration is held until the yaw rate target deceleration becomes in excess of the corrected yaw rate target deceleration (at point of D in FIG. 12) in a case where the yaw rate target deceleration is equal to or larger than a predetermined value (dot line with a sign C in FIG. 12).

(Advantage 4)

In the second calculation method, the variation in the deceleration in a midway through the curved road run (not the curved road exit) can be suppressed to be small. Hence, the vehicle driver (occupant) does not give the unpleasant jerky feeling. In addition, the deceleration control is continued so as to obtain the deceleration effect. Furthermore, the following step S113-3 may be added subsequent to step S113-2.

(Step S113-3)

At this step S113-3, controller 10 furthermore corrects corrected yaw rate target deceleration Xgyaw1* held at step S113-2.

For example, a predetermined value of Kyaw is gradually added to corrected yaw rate target deceleration Xgyaw1* as shown in the following equation (15) after the end of the holding of corrected yaw rate target deceleration Xgyaw1* at step S113-2.

$$Xgyaw1* = Xgyaw1* + Kyaw \quad (15)$$

That is to say, corrected yaw rate target deceleration is held until Xgyaw1* ≤ Xgyaw* is satisfied. Furthermore, if the process at step S113-3 is executed, the corrected yaw rate deceleration is held for a predetermined time F (for example, three seconds) as shown in FIG. 12 and, thereafter, the corrected yaw rate target deceleration is gradually increased by a certain predetermined value, as shown by a line of E in FIG. 12.

(Advantage 5)

Figure 13:
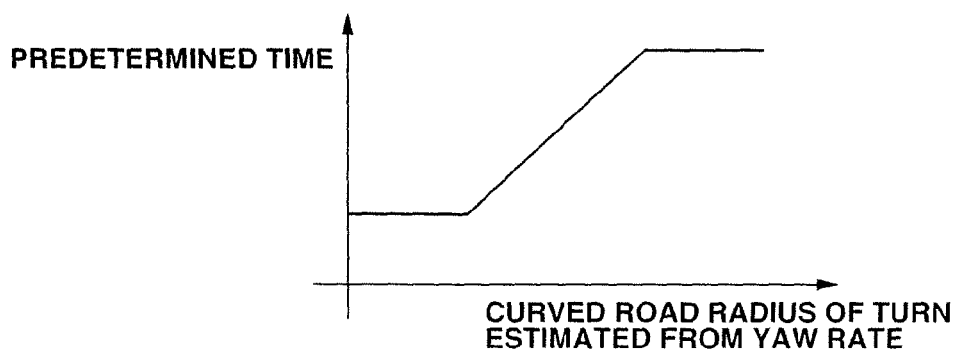
FIG. 13 is a characteristic graph representing a relationship between a predetermined time shown in FIG. 12 and the radius of turn of the curved road estimated from a yaw rate.
Figure 14:
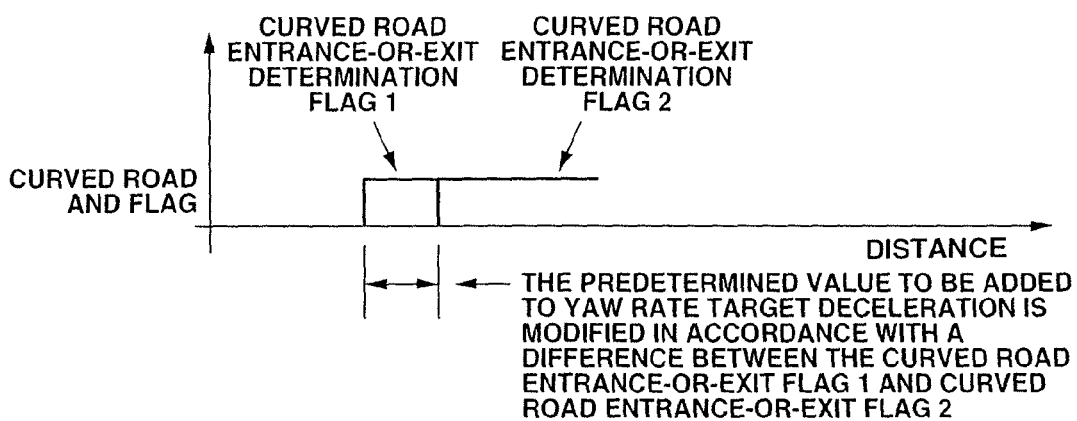
FIG. 14 is a characteristic graph representing a relationship between states of two kinds of the curved road entrance-or-exit determination flags at a curved road entrance.
Figure 15:
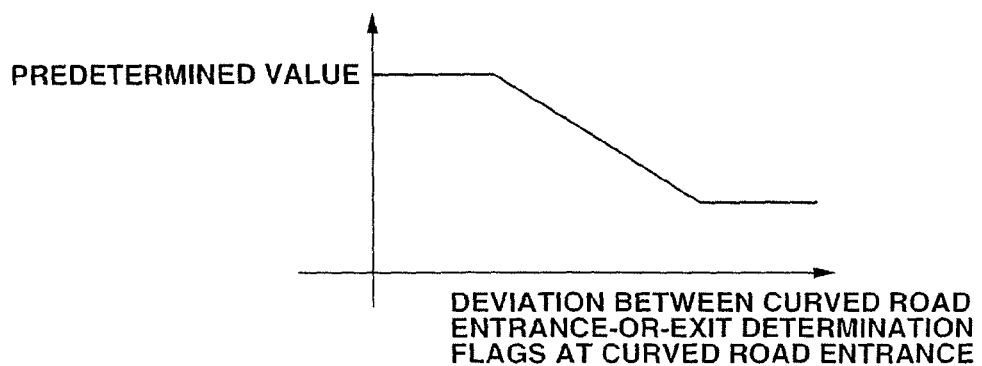
FIG. 15 is a characteristic graph representing a relationship between a predetermined value to be gradually added to a corrected yaw rate target deceleration and the states of the two kinds of the curved road entrance-or-exit determination flags.

Thus, the variation in the deceleration in the midway through the curved road (not the exit of the curved road) can be suppressed to be small. Thus, the unpleasant jerky feeling given to the vehicle driver can be reduced. It should herein be noted that, although the corrected yaw rate target deceleration is held for predetermined time F as described above, this predetermined time F may be varied in accordance with the radius of turn of the curved road estimated from the yaw rate as shown in FIG. 13. In addition, at step S113-3, predetermined value Kyaw is gradually added to corrected yaw rate target deceleration Xgyaw1* as shown in equation (15). However, for example, as shown in FIG. 14, since a (positional) deviation (difference) between the curved road entrance estimated from the radius of turn calculated from the navigation information and the curved road entrance estimated from the radius of turn estimated from the yaw rate has a possibility of continuing at the exit of the curved road (providing the same deviation at the exit of the curved road), predetermined value (gradient of increase) Kyaw may be varied in accordance with the (positional) deviation (difference) therebetween at the entrance of the curved road. For example, as shown in FIG. 15, predetermined value (gradient of increase) Kyaw becomes smaller as the (positional) deviation (difference) on the entrance becomes larger. As the (positional) deviation (difference) becomes smaller, predetermined value (gradient of increase) Kyaw may become larger.

(Third Calculation Method)

The third calculation method is such that, in a case where the rising edge of curved road entrance-or-exit determination flag 2 fcurv_inout_drv based on the driver operation is not detected in the same way as the second calculation method and, furthermore, yaw rate target deceleration Xgyaw* is equal to or smaller than predetermined value (C), step S113-3 in the second calculation method is replaced with the following step S113-4.

(Step S113-4)

Figure 16:
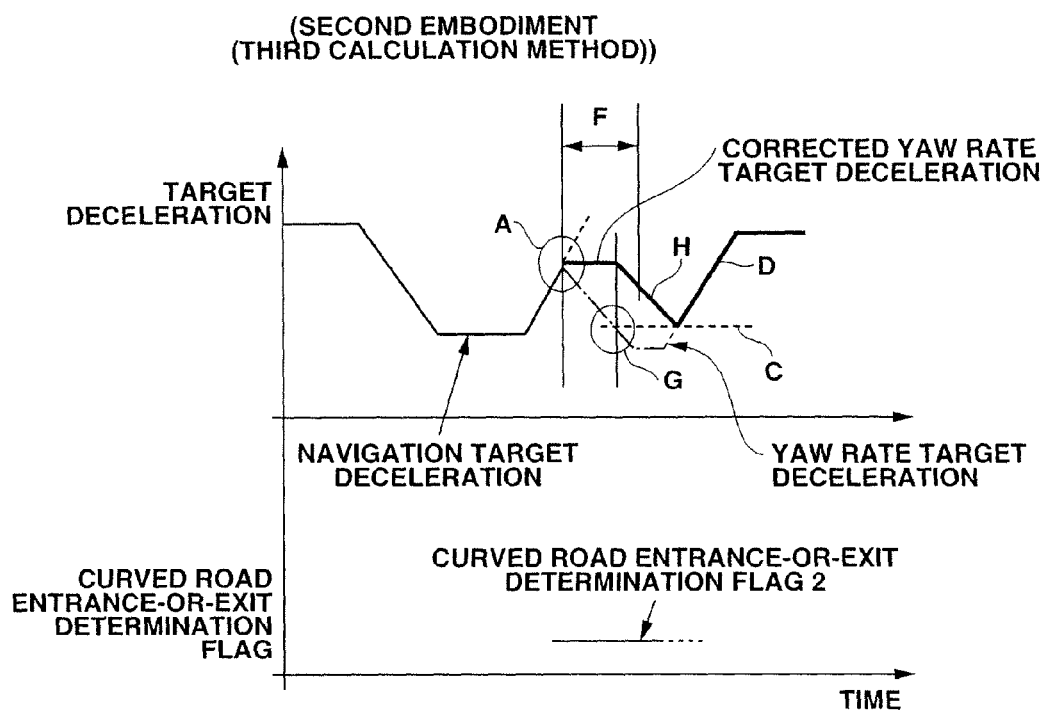
FIG. 16 is a timing chart representing the time variations of the target deceleration and the curved road entrance-or-exit flag related to a third calculation method of the corrected yaw rate target deceleration command value in the second embodiment of the vehicular running control apparatus according to the present invention.

At step S113-4, controller 10 furthermore corrects corrected yaw rate target deceleration Xgyaw1* obtained at step S113-2. For example, at step S113-2, in a case where, during corrected yaw rate target deceleration Xgyaw1* being held for predetermined time F as shown in FIG. 16, yaw rate target deceleration Xgyaw* is equal to or below certain predetermined value (dot line of C in FIG. 16) (at a point of G in FIG. 16), another predetermined value of Kyaw1 is gradually subtracted from corrected yaw rate target deceleration Xgyaw1* as shown in the following equation (16) (refer to a solid line of H in FIG. 16). At this time, the minimum value of the corrected yaw rate target deceleration provides yaw rate target deceleration Xgyaw*.

Thereafter, in a case where Xgyaw1* = Xgyaw* as in the following equation (17), corrected yaw rate target deceleration Xgyaw1* is increased in accordance with yaw rate target deceleration Xgyaw*.

$$Xgsaw1* = Xgyaw1* - Kyaw1 \quad (16)$$

$$Xgyaw1* = Xgyaw* \quad (17)$$

That is to say, if, during holding of the corrected yaw rate target deceleration (region F) as shown in FIG. 16, the yaw rate target deceleration becomes equal to or below predetermined value C as shown in point G in FIG. 16, the predetermined value is gradually subtracted from the corrected yaw rate target deceleration as shown by a solid line H in FIG. 16. Then, thereafter, in a case where the corrected yaw rate target deceleration becomes equal to the yaw rate target deceleration, the yaw rate target deceleration provides the corrected yaw rate target deceleration.

(Advantage 6)

Figure 17:
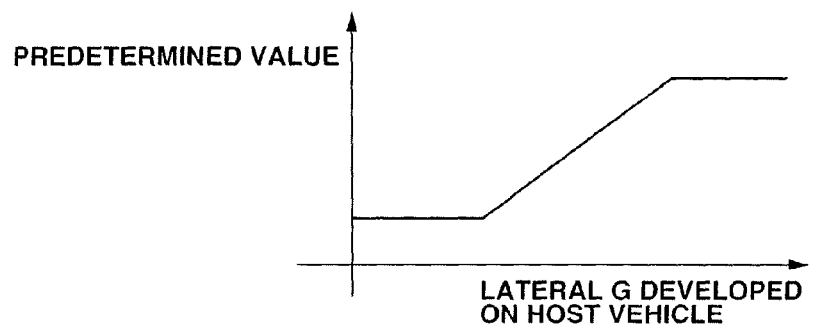
FIG. 17 is a characteristic graph representing a relationship between the predetermined value by which the corrected yaw rate target deceleration is gradually subtracted and a lateral (acceleration (G)) developed on the vehicle in the second embodiment of the vehicular running control apparatus according to the present invention.

In the case of the third calculation method, the abrupt variation in the deceleration can be suppressed. The target deceleration can be varied in accordance with the variation of the yaw rate target deceleration. Thus, a desired deceleration effect can be achieved. It should be noted that predetermined value (gradient of decrease) subtracted from corrected yaw rate target deceleration Xgyaw1* may be modified in accordance with lateral acceleration G developed on the vehicle, as shown in FIG. 17. For example, in a case where, as lateral G becomes larger, predetermined value (gradient of decrease) Kyaw1 becomes larger. As lateral acceleration G becomes smaller, predetermined value of Kyaw1 becomes smaller. In addition, although, in the alternative case, a magnitude of predetermined value Kyaw1 is modified in accordance with the magnitude of lateral acceleration G, predetermined value (gradient of decrease) Kyaw1 may be modified in accordance with lateral acceleration G, a variation rate of the yaw rate, and a steering speed of the steering wheel. It should also be noted that a curved road state detecting section (means) recited in each of the claims corresponds to navigation information processing section 101 shown in FIG. 2.

In addition, a target vehicle speed calculating section (means) defined in the claims corresponds to target vehicle speed calculating section 102 shown in FIG. 2 and step S106. A navigation target deceleration calculating section (means) defined in the claims corresponds to navigation target deceleration calculating section 103 shown in FIG. 2 and a step S110. A yaw rate detecting section (mans) defined in the claims corresponds to a yaw rate sensor 22 shown in FIG. 2. A yaw rate target deceleration calculating section (means) defined in the claims corresponds to a yaw rate target deceleration calculating section 104 and step S112. A target deceleration selecting section (means) defined in the claims corresponds to target deceleration selecting section 106 shown in FIG. 2 and step S114. A acceleration/deceleration section (means) defined in the claims corresponds to acceleration/deceleration control unit 30 and steps S120 through S124. In addition, a curved road entrance-or-exit determining section defined in the claims corresponds to navigation target deceleration calculating section 103 shown in FIG. 2 and yaw rate target deceleration calculating section 104 and step S111.

It should be noted that the above-described embodiments are described in order to facilitate a better understanding of the present invention and do not limit the scope of the present invention. Hence, each essential element disclosed in the above-described embodiments includes all design modifications and equivalents belonging to the scope of the present invention.

This application is based on prior Japanese Patent Applications No. 2007-199038 and No. 2008-096503. The entire contents of Japanese Patent Applications No. 2007-199038 with a filing date of Jul. 31, 2007 and No. 2008-096503 with a filing date of Apr. 2, 2008 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A vehicular running control apparatus, comprising:
 a curved road detecting section configured to detect a state of a curved road located in front of a running road on which the vehicle is running on a basis of an obtained navigation information;
 a target vehicle speed calculating section configured to calculate a target vehicle speed of the vehicle at the curved road on a basis of the state of the curved road detected by the curved road detecting section and a preset lateral acceleration set value of the vehicle;
 a navigation target deceleration calculating section configured to calculate a navigation target deceleration at a present running position of the vehicle on a basis of the target vehicle speed calculated by the target vehicle speed calculating section;
 a yaw rate detecting section configured to detect a yaw rate and provide the detected yaw rate;
 a yaw rate target deceleration calculating section configured to calculate a yaw rate target deceleration of the vehicle on a basis of the yaw rate detected by the yaw rate detecting section and the lateral acceleration set value separately from the navigation target deceleration;
 a target deceleration selecting section configured to compare the yaw rate target deceleration calculated by the yaw rate target deceleration calculating section with the navigation target deceleration calculated by the navigation target deceleration calculating section to select the target deceleration from one of the yaw rate and navigation target decelerations which is lower than the other;
 a target vehicle speed command value calculating section configured to calculate a target vehicle speed command value on a basis of the target deceleration selected by the target deceleration selecting section; and
 a curved road entrance-or-exit determining section configured to determine whether the vehicle is to run or not to run on an entrance or exit of the curved road, wherein the target deceleration selecting section compares the yaw rate target deceleration with the navigation target deceleration to select the target deceleration from one of the yaw rate target deceleration and the navigation target deceleration which is lower than the other, when the curved road entrance-or-exit determining section determines that the vehicle is to run on the entrance or exit of the curved road.

2. The vehicular running control apparatus as claimed in claim 1, wherein the yaw rate target deceleration calculating section zeroes a minimum value of the yaw rate target deceleration of the vehicle calculated on a basis of the yaw rate of the vehicle.

3. The vehicular running control apparatus as claimed in claim 1, wherein the vehicular running control apparatus further comprises: a car navigation system providing the navigation information; a vehicle speed detecting section configured to provide a vehicle speed information of the vehicle; and an acceleration-or-deceleration control section configured to perform an acceleration-or-deceleration control for the vehicle according to a command value calculated by the target vehicle speed command value calculating section.

4. The vehicular running control apparatus as claimed in claim 1, wherein the curved road entrance-or-exit determining section determines that the vehicle is to run on the entrance or exit of the curved road on a basis of a yaw rate curved road entrance-or-exit determination determined on a basis of a radius of turn of the curved road estimated from the yaw rate detected by the yaw rate detecting section and a navigation curved road entrance-or-exit determination determined on a basis of the radius of turn of the curved road detected by the curved road detecting section.

5. The vehicular running control apparatus as claimed in claim 4, wherein the target deceleration selecting section compares the yaw rate target deceleration with the navigation target deceleration to select the target deceleration from one of the yaw rate target deceleration and the navigation target deceleration which is lower than the other on a basis of at least one or more of results of the yaw rate and navigation curved road entrance-or-exit determinations.

6. The vehicular running control apparatus as claimed in claim 1, wherein the target deceleration selecting section corrects the yaw rate target deceleration in accordance with a presence or absence of the curved road entrance-or-exit determination made by the curved road entrance-or-exit determining section.

7. The vehicular running control apparatus as claimed in claim 6, wherein the target deceleration selecting section corrects the yaw rate target deceleration in order for a minimum value of the yaw rate target deceleration to become a predetermined value, when the vehicle is determined to run on the exit of the curved road in a result of the curved road entrance-or-exit determination by the curved road entrance-or-exit determining section.

8. The vehicular running control apparatus as claimed in claim 6, wherein the target deceleration selecting section corrects the yaw rate target deceleration to a value of the navigation target deceleration and holds the corrected yaw rate target deceleration for a predetermined time, when the vehicle is determined not to run on the exit of the curved road in a result of the curved road entrance-or-exit determination by the curved road entrance-or-exit determining section and the yaw rate target deceleration when the vehicle is determined not to run on the exit of the curved road becomes lower than the navigation target deceleration.

9. The vehicular running control apparatus as claimed in claim 8, wherein the target deceleration selecting section modifies a holding time of the corrected yaw rate target deceleration on a basis of whether the yaw rate target deceleration becomes lower than a predetermined value set to be equal to or lower than the corrected yaw rate target deceleration during a holding of the corrected yaw rate target deceleration.

10. The vehicular running control apparatus as claimed in claim 8, wherein the target deceleration selecting section holds the corrected yaw rate target deceleration while the yaw rate target deceleration is increased and exceeds the corrected yaw rate target deceleration.

11. The vehicular running control apparatus as claimed in claim 8, wherein the target deceleration selecting section gradually increases the corrected yaw rate target deceleration, when the yaw rate target deceleration does not become lower than a predetermined value set to be equal to or lower than the corrected yaw rate target deceleration during the holding of the corrected yaw rate target deceleration.

12. The vehicular running control apparatus as claimed in claim 8, wherein the target deceleration selecting section gradually decreases the corrected yaw rate target deceleration when the yaw rate target deceleration becomes lower than a predetermined value set to be equal to or lower than the corrected yaw rate target deceleration during the holding of the corrected yaw rate target deceleration.

13. The vehicular running control apparatus as claimed in claim 11, wherein the target deceleration selecting section modifies a gradient of an increase in the corrected yaw rate target deceleration or a holding time of the corrected yaw rate target deceleration on a basis of at least one or more of a positional deviation between a yaw rate curved road entrance based on a radius of turn of the curved road calculated from a driver operation and determined by the curved road entrance-or-exit determining section and a navigation curved road entrance based on the radius of turn calculated from navigation information of a car navigation system and determined by the curved road entrance-or-exit determining section and the radius of turn of the curved road estimated from the yaw rate.

14. The vehicular running control apparatus as claimed in claim 12, wherein the target deceleration selecting section modifies a gradient of a decrease in the corrected yaw rate target deceleration or a holding time of the corrected yaw rate target deceleration on a basis of at least one or more of a radius of turn of the curved road estimated from the yaw rate and a magnitude of the lateral acceleration.

15. The vehicular running control apparatus as claimed in claim 13, wherein the gradient of the increase becomes smaller as the positional deviation between the yaw rate curved road entrance and the navigation curved road entrance becomes larger.

16. The vehicular running control apparatus as claimed in claim 14, wherein the gradient of the decrease becomes larger as the lateral acceleration developed on the vehicle becomes larger.

17. The vehicular running control apparatus as claimed in claim 7, wherein the predetermined value is zero.

18. A vehicular running control apparatus, comprising:
curved road detecting means for detecting a state of a curved road located in front of a running road on which the vehicle is running on a basis of an obtained navigation information;
target vehicle speed calculating means for calculating a target vehicle speed of the vehicle at the curved road on a basis of the state of the curved road detected by the curved road detecting means and a preset lateral acceleration set value of the vehicle;
navigation target deceleration calculating means for calculating a navigation target deceleration at a present running position of the vehicle on a basis of the target vehicle speed calculated by the target vehicle speed calculating means;
yaw rate detecting means for detecting a yaw rate and providing the detected yaw rate;
yaw rate target deceleration calculating means for calculating a yaw rate target deceleration of the vehicle on a basis of the yaw rate detected by the yaw rate detecting means and the lateral acceleration set value separately from the navigation target deceleration;
target deceleration selecting means for comparing the yaw rate target deceleration calculated by the yaw rate target deceleration calculating means with the navigation target deceleration calculated by the navigation target deceleration calculating means to select the target deceleration from one of the yaw rate and navigation target decelerations which is lower than the other; and
target vehicle speed command value calculating means for calculating a target vehicle speed command value on a basis of the target deceleration selected by the target deceleration selecting means; and
curved road entrance-or-exit determining means for determining whether the vehicle is to run or not to run on an entrance or exit of the curved road, wherein the target deceleration selecting means compares the yaw rate target deceleration with the navigation target deceleration to select the target deceleration from one of the yaw rate target deceleration and the navigation target deceleration which is lower than the other, when the curved road entrance-or-exit determining means determines that the vehicle is to run on the entrance or exit of the curved road.

* * * * *